Oct. 21, 1969    M. SHACHTER    3,473,414
LIMITED SLIP GEARED DIFFERENTIAL WITH NON-CIRCULAR GEARS
Filed March 14, 1968    2 Sheets-Sheet 1
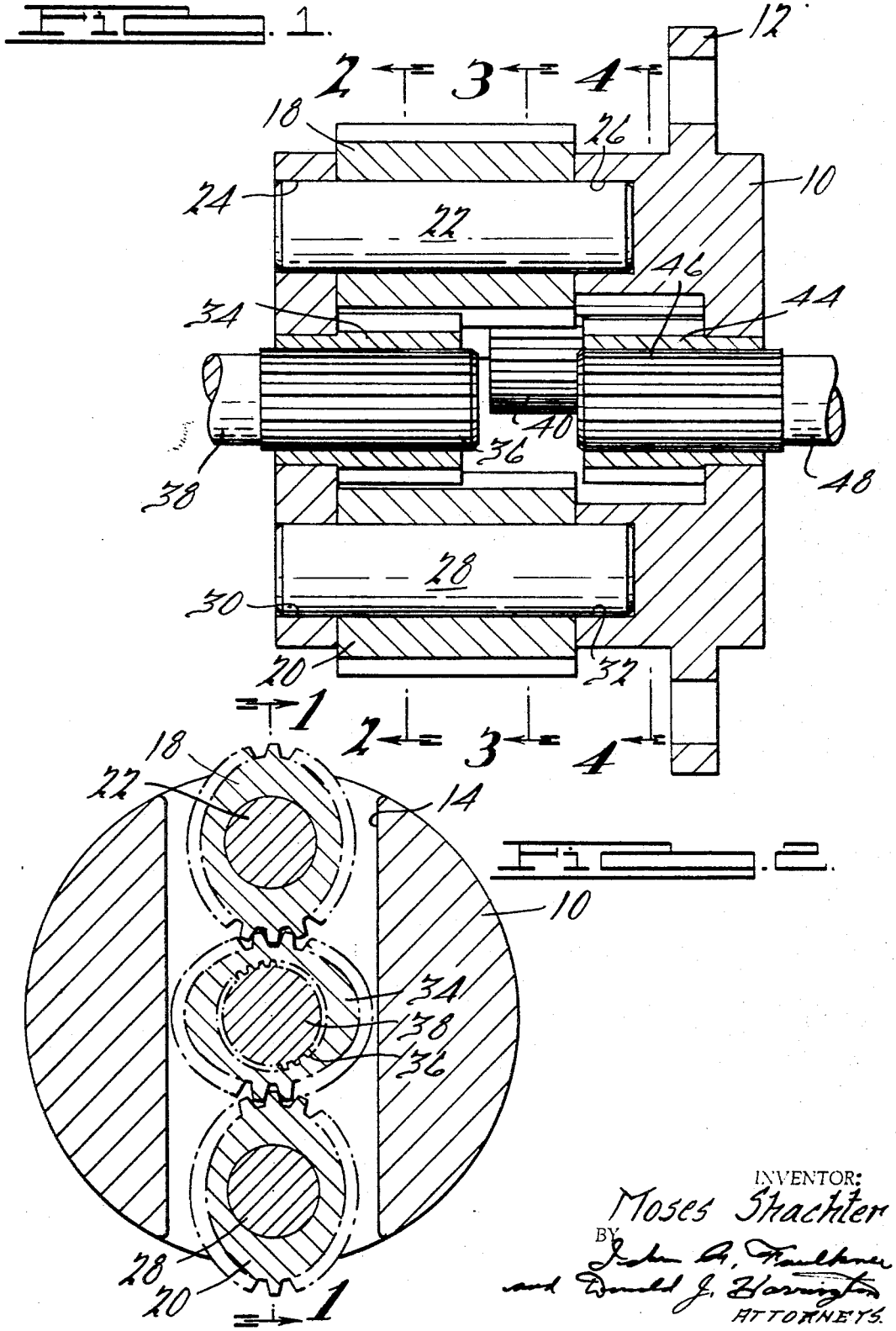
INVENTOR:
Moses Shachter
BY
ATTORNEYS.

Oct. 21, 1969  M. SHACHTER  3,473,414
LIMITED SLIP GEARED DIFFERENTIAL WITH NON-CIRCULAR GEARS
Filed March 14, 1968  2 Sheets-Sheet 2

INVENTOR:
Moses Shachter
BY
ATTORNEYS

United States Patent Office 3,473,414
Patented Oct. 21, 1969

3,473,414
LIMITED SLIP GEARED DIFFERENTIAL WITH NON-CIRCULAR GEARS
Moses Shachter, Oak Park, Mich., assignor to Ford Motor Company, Dearborn, Mich., a corporation of Delaware
Filed Mar. 14, 1968, Ser. No. 713,127
Int. Cl. F16h 1/42, 1/44, 35/02
U.S. Cl. 74—710.5                           6 Claims

ABSTRACT OF THE DISCLOSURE

A geared, torque-delivery, differential mechanism for use in an automotive vehicle drive-line. It comprises non-circular gear elements that tend to impart a variable angular velocity to driven axle shafts as the pinion carrier for the mechanism rotates at a relatively uniform speed with one axle shaft overspeeding the other. During normal straight-ahead driving operation with both axle shafts rotating in unison, driving torque is distributed from the carrier to the axle shafts without differential motion or pulsating torque transfer.

GENERAL DESCRIPTION OF THE INVENTION

In automotive vehicle drivelines it is usual practice to deliver engine torque to each of two traction wheels through a driveshaft and a geared differential mechanism, the output elements of the latter being connected drivably to each of two axle shafts for the traction wheels.

The differential gearing is adapted to divide the torque applied to the driveshaft between each of the axle shafts. It is capable of accommodating both overspeeding and underspeeding of one wheel with respect to the other without interrupting the torque delivery path to either wheel.

Geared differentials of this kind are incapable, however, of delivering driving torque to both wheels as one loses traction. The wheel that loses its traction spins uncontrollably. In overcoming this problem, it is known practice to provide a friction clutch between one of the torque delivery gears of the differential and the associated differential carrier housing thereby introducing a torque bias if relative motion should occur between the two axle shafts. This will cause at least a portion of the driving torque to be delivered to the high traction wheels notwithstanding the loss of traction on the other wheel. It is known practice also to provide a positive-drive differential for maintaining a continuous torque-delivery path to one of the two axle shafts by clutching directly the differential carrier to a torque delivery element that is connected in turn to the output gear of the differential or to the high traction axle shaft.

The improved differential gearing of my invention is capable of providing a limited slip differential characteristic, although I do not require the use of friction clutches or positive drive locking elements of the conventional kind. I rely solely upon an inertia torque bias that is established only when one of the axle shafts overruns the other. The torque bias is obtained by reason of the geometric characteristics of the gearing elements in the differential itself.

It is an object of my invention to provide a limited slip differential having the characteristics normally obtained through the use of auxiliary differential clutches but which does not require the use of friction torque bias elements. My improved differential comprises a carrier, planet pinions rotatably journalled in the carrier and differential side gears engageable with the pinions. The gears and the pinions are non-circular in shape. The contact points for the various meshes thus occur at radii that vary with respect to the centers of rotation of the gears themselves. This results in a fluctuating angular velocity for the gears and the pinions, which in turn produce inertia forces. These inertia forces are complemented by the inertia forces developed in the road wheel itself as that traction wheel loses traction on the road surface. The total torque bias then resists continued differences in the angular velocities of the two axle shafts, the amount of the bias increasing as the angular velocity differential increases. The amount of the increase in the torque bias is related exponentially to the difference in speed.

If it is assumed that one of the road wheels remains stationary and the other wheel begins to slip on the road surface due to a low friction coefficient, the slipping wheel will rotate with a variable angular velocity and the velocity vector will complete two speed cycles for each revolution of the carrier housing. The resulting inertia torque, which has a peak value that is higher than the constant driving torque delivered to the carrier, tends to move the vehicle in the normal driving direction.

BRIEF DESCRIPTION OF THE FIGURES OF THE DRAWING

FIGURE 1 shows in longitudinal cross-sectional form an assembly view of my improved differential gearing. FIGURE 1 is taken along the plane of section line 1—1 of FIGURE 2.

FIGURE 2 is a cross-sectional view taken along the plane of section line 2—2 of FIGURE 1.

PARTICULAR DESCRIPTION OF THE INVENTION

Figure 3:
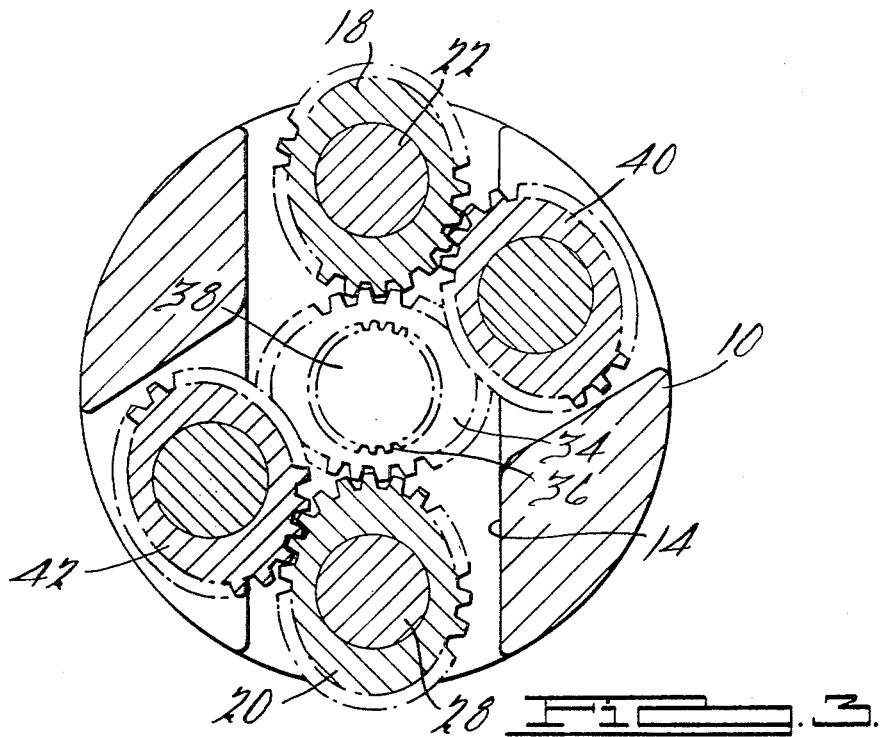
FIGURE 3 is a cross-sectional view taken along the plane of section line 3—3 of FIGURE 1.

In FIGURE 1 numeral 10 designates a carrier for a differential gear unit. The carrier includes a flange 12 to which may be bolted a ring gear, not shown. The ring gear in turn is connected drivably to the driving pinion of a differential-and-axle assembly. The pinion in turn can be driven by the drive-shaft of an automotive vehicle driveline. The carrier 10 includes a first opening 14 and a second opening 16, both openings extending transversely through the carrier 10. They intersect, as indicated in FIGURE 3, at the central region of the carrier 10.

A pair of differential pinions 18 and 20 is journalled in the opening 14. Pinion 18 is rotatably supported by pinion shaft 22, which in turn is received within shaft openings 24 and 26 in the housing 10. A corresponding pinion shaft 28 journals rotatably the pinion 20 and is end-supported in pinion shaft openings 30 and 32.

Figure 4:
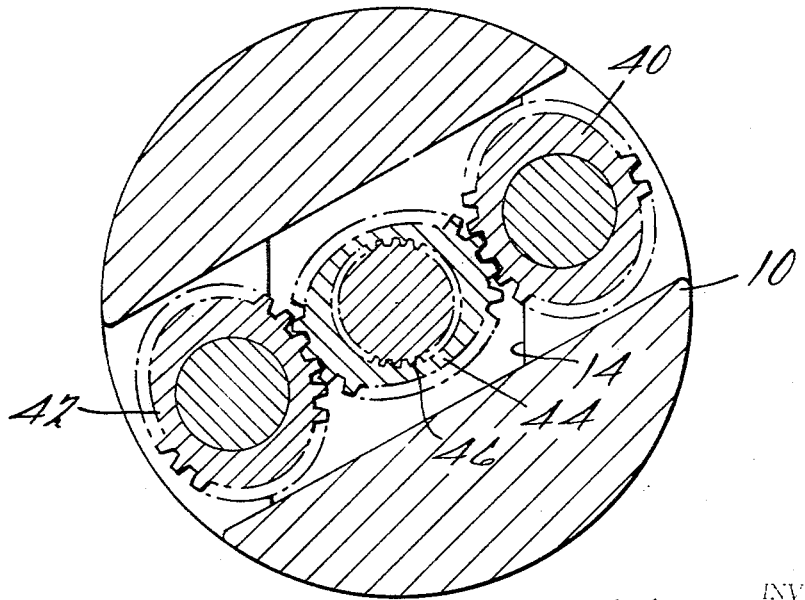
FIGURE 4 is a cross-sectional view taken along the plane of section line 4—4 of FIGURE 1.

As indicated best in FIGURE 2, pinions 18 and 20 mesh with side gear 34, which is splined at 36 to the inboard end of an axle shaft 38. Pinions 18 and 20 mesh also, as indicated in FIGURE 3, with pinions 40 and 42, respectively. These pinions in turn mesh with the second side gear 44, as indicated in FIGURE 4. Side gear 44 is splined at 46, as seen in FIGURE 1, to the second axle shaft 48.

Each of the gears 34 and 44 and each of the pinions 18, 20, 40 and 42 is non-circular. In the particular embodiment disclosed here, the pinions and gears are elliptical. The radius of the circle at the point of contact indicated in FIGURE 2 is at a maximum when the radius of the pitch circle for the gear 34 at the same point of contact is a minimum. The pitch circle radius of pinion 18 also is a maximum at the point of contact with the gear 34 when the effective pitch diameter of the gear 34 at that same point is a minimum.

The pinions 18 and 20 mesh respectively with pinions 40 and 42 in the same fashion. Similarly, gear 44 meshes with the pinions 40 and 42 in the same way. That is, the maximum effective pitch diameter for the pinions occurs simultaneously with the minimum effective pitch diameter of the gear 44. With this arrangeent, it is possible to achieve an oscillating torque on the side gears when differential action occurs. If it is assumed that the angular velocity of carrier 10 is a constant, and if it is assumed further that axle shaft 48, for example, is held stationary, angular motion of the carrier 10 will be imparted to the shaft 38 through the differential gearing. The instantaneous motion of the shaft 38, however, will differ from a quantity equal to twice the average angular velocity of the carrier 10 by either a positive increment or a negative increment depending upon the phased relationship of the gear 34 with respect to the gear 44. The resultant variable angular velocity imparted to the gear 34 will be characterized by two cycles for each revolution of the carrier 10. That is, there will be two relative angular velocity changes for each revolution of the side gear 10. This will produce a resultant pulsating torque which, at its peak, will exceed the constant driving torque applied to the carrier 10. The pulsating torque imparted to the gear 34 and the shaft 38 is partly due to the torque reaction of the entire oscillating mass, the latter including the traction wheel of lowest frictional coefficient. This torque reaction provides, in effect, a torque bias that will permit torque to be delivered in a forward driving direction to the driving wheel that is connected to shaft 48.

Conversely, the gear 44 and the shaft 48 will function in a fashion similar to the behavior of gear 34 and shaft 38, described in the foregoing paragraphs, when the road wheel connected to shaft 48 loses traction with respect to the road wheel connected to shaft 38. That is, the gear 44 and its associated wheel will now become an oscillating mass due to the variable angular velocity imposed upon the non-circular gear 44 by the non-circular gear elements of the system as the carrier 10 is driven at a constant velocity by the vehicle engine.

During normal straight ahead driving with minimum differential action occurring, the difference in the speeds of the two road wheels is slight. Therefore, the alternating inertia torque that is induced by the gear differential is negligible.

The gears and pinions of the structure disclosed here may have spur teeth. They may be produced, for example, by an extrusion method by extruding a length of bar stock through non-circular extrusion dies and then cutting the gears and pinions to length. It is possible, however, to use helical gears instead of spur gears if the advantages of the helical gearing is considered desirable in any particular environment.

I expect that non-circular gears having shapes other than elliptical also may be used. The only requirement is that the operating radius at the points of contact on the various pitch circles be non-uniform as the gears and pinions rotate during differentiation.

Having thus described a preferred form of my invention, what I claim and desire to secure by U.S. Letters Patent is:

1. A geared torque transmitting differential assembly adapted to deliver driving torque from a driving member to each of two driven shafts, a first side gear carried by one driven shaft, a second side gear carried by the other driven shaft, a first pinion engageable with said first side gear and rotatably journalled on said driving member, a second pinion engageable with said second side gear and rotatably journalled on said driving member, said pinions being in meshing engagement with each other, said pinions and said gears having conjugate external teeth, the pitch lines of said teeth being non-circular whereby an oscillating angular motion is imparted to one side gear as it is overspeeded with respect to the other side gear thereby introducing a torque bias, the magnitude of which is determined in part by the dynamic mass that is secured to the overspeeded driven shaft.

2. The combination as set forth in claim 1 wherein said pinions and said side gears have pitch lines of elliptical form, one pinion of each pair of pinions meshing with one side gear on a major axis for said pitch line which coincides with the minimum radius pitch point for one said side gear.

3. The combination as set forth in claim 2 wherein the other pinion of each pair of pinions meshes with the other side gear as a major axis for said pitch line which coincides with the minimum radius pitch point for said other side gear.

4. A geared torque transmitting differential assembly adapted to deliver driving torque from a driving member to each of two driven shafts, a first side gear carried by one driven shaft, a second side gear carried by the other driven shaft, a first pair of pinions, a first of said pair of pinions engageable with said first side gear and rotatably journalled on said driving member, a second of said pair of pinions engageable with said second side gear and rotatably journalled on said driving member, said pinions being in meshing engagement with each other, said pinions and said gears having conjugate external teeth, the pitch lines of said teeth being non-circular whereby an oscillating angular motion is imparted to one side gear as it is overspeeded with respect to the other side gear thereby introducing a torque bias, the magnitude of which is determined in part by the dynamic mass that is secured to the overspeeded driven shaft, a second pair of pinions journalled on said driving member, one pinion of said second pair being engageable with said first side gear, the other of said second pair of pinions being engageable with said second side gear, said pinions of said second pair being engageable with each other, the geometry of the pinions of said second pair being similar to the geometry of the pinions of said first pair.

5. The combination as set forth in claim 4 wherein said pinions and said side gears have pitch lines of elliptical form, one pinion of each pair of pinions meshing with one side gear on a major axis for said pitch line which coincides with the minimum radius pitch point for one said side gear.

6. The combination as set forth in claim 5 wherein the other pinion of each pair of pinions meshes with the other side gear as a major axis for said pitch line which coincides with the minimum radius pitch point for said other side gear.

References Cited

UNITED STATES PATENTS

| | | | |
|---|---|---|---|
| 2,296,892 | 9/1942 | Andrew | 74—394 |
| 2,312,376 | 3/1943 | Andrew | 74—394 X |
| 2,378,967 | 6/1945 | Andrew | 74—394 X |
| 2,788,679 | 4/1957 | Mott | 74—714 |
| 3,127,791 | 4/1964 | Roe | 74—714 X |

LEONARD H. GERIN, Primary Examiner

U.S. Cl. X.R.

74—394, 437, 714